US009544795B2

(12) United States Patent
Lu et al.

(10) Patent No.: US 9,544,795 B2
(45) Date of Patent: Jan. 10, 2017

(54) METHODS AND DEVICES OF INTERFERENCE CHANNEL MEASUREMENT IN RADIO NETWORK

(75) Inventors: Qianxi Lu, Beijing (CN); Qingyu Miao, Beijing (CN); Yu Qian, Beijing (CN); Xinghua Song, Beijing (CN)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 96 days.

(21) Appl. No.: 14/383,192

(22) PCT Filed: Mar. 14, 2012

(86) PCT No.: PCT/CN2012/000317
§ 371 (c)(1),
(2), (4) Date: Sep. 5, 2014

(87) PCT Pub. No.: WO2013/134891
PCT Pub. Date: Sep. 19, 2013

(65) Prior Publication Data
US 2015/0038135 A1  Feb. 5, 2015

(51) Int. Cl.
*H04W 4/00* (2009.01)
*H04W 24/08* (2009.01)
(Continued)

(52) U.S. Cl.
CPC ............ *H04W 24/08* (2013.01); *H04J 11/005* (2013.01); *H04J 11/0023* (2013.01); *H04L 5/005* (2013.01);
(Continued)

(58) Field of Classification Search
USPC ............ 455/426.1, 67.11; 370/335, 342, 458
See application file for complete search history.

(56) References Cited

U.S. PATENT DOCUMENTS

2006/0245398 A1* 11/2006 Li et al. ............... 370/335
2010/0093364 A1   4/2010 Ribeiro et al.
(Continued)

FOREIGN PATENT DOCUMENTS

WO   2009/009401 A1   1/2009
WO   2011050519 A1    5/2011

OTHER PUBLICATIONS

International Preliminary Report on Patentability for PCT/CN2012/000317, mailed Sep. 25, 2014, 6 pages.
(Continued)

*Primary Examiner* — David Q Nguyen
(74) *Attorney, Agent, or Firm* — Withrow + Terranova, PLLC

(57) ABSTRACT

The present invention provides a method in a base station for determining channel interference in a radio network comprising a device-to-device, D2D, capable UE and the base station serving at least one cellular UE, said method comprising: configuring the at least one cellular UE with a cellular uplink Reference Symbol, RS, related parameter; transmitting the cellular uplink RS related parameter associated with the at least one cellular UE to the D2D capable UE; and obtaining information of interference to the D2D capable UE measured by the D2D capable UE using the cellular uplink RS related parameter. The present invention also provides a corresponding method in D2D capable UE and the devices thereof. This achieves a more accurate the interference channel measurement in multi-cell and multi-antenna scenario.

11 Claims, 7 Drawing Sheets

(51) Int. Cl.
*H04L 5/00* (2006.01)
*H04W 72/04* (2009.01)
*H04W 76/02* (2009.01)
*H04J 11/00* (2006.01)
*H04W 88/06* (2009.01)
*H04W 88/10* (2009.01)
*H04W 92/18* (2009.01)
*H04L 27/26* (2006.01)

(52) U.S. Cl.
CPC ........... *H04L 5/0073* (2013.01); *H04L 5/0091* (2013.01); *H04W 72/042* (2013.01); *H04W 76/023* (2013.01); *H04L 27/2613* (2013.01); *H04W 88/06* (2013.01); *H04W 88/10* (2013.01); *H04W 92/18* (2013.01)

(56) References Cited

U.S. PATENT DOCUMENTS

2011/0170440 A1    7/2011  Gaal et al.
2011/0255431 A1   10/2011  Wang et al.
2013/0189930 A1*   7/2013  Kinnunen ............. H04W 16/12
                                                     455/67.11

OTHER PUBLICATIONS

International Search Report and Written Opinion for PCT/CN2012/000317, mailed Dec. 20, 2012, 10 pages.
Fodor, Gábor, et al., "Design Aspects of Network Assisted Device-to-Device Communications," IEEE communications Magazine, vol. 50, Issue 3, May 2011, IEEE, pp. 2-9.
Extended European Search Report for European Patent Application No. 12871474.8, mailed Dec. 15, 2015, 9 pages.

* cited by examiner

METHODS AND DEVICES OF INTERFERENCE CHANNEL MEASUREMENT IN RADIO NETWORK

This application is a 35 U.S.C. §371 national phase filing of International Application No. PCT/CN2012/000317, filed Mar. 14, 2012, the disclosure of which is incorporated herein by reference in its entirety.

TECHNICAL FIELD

The invention generally relates to communication networks, in particular to methods and devices of interference channel measurement in a radio network environment including a device-to-device, D2D, capable UE and a base station serving at least one cellular UE.

BACKGROUND

Recent developments in 3GPP Long Term Evolution (LTE) facilitate accessing local IP-based services in the home, offices, public hot spots or even outdoor environments. One of the important use cases for the local IP access and local connectivity involves the direct communication between devices in the close proximity (often referred to as "D2D" communication, typically less than a few tens of meters, but sometimes up to a few hundred meters) of each other.

In most cases, the D2D transmission can reuse cellular uplink (UL) resources. To implement this direct D2D communication in a traditional cellular network, it is important to get knowledge of the interference channel between the cellular UE transmitter and D2D UE receiver to avoid strong intra-cell interference, i.e., interference from cellular UL transmission to D2D link within the cell.

To get information about this interference channel from cellular UE transmitter to D2D UE receiver, the prior arts proposed some approaches by enabling D2D UEs to monitor the received interference from UL transmission by cellular UEs. However, existing interference measurement schemes have not proposed a solution in the multi-cell and multi-antenna scenario. For example, in a multi-cell scenario, the interference could not be measured in a UE-specific way (i.e., for each cellular UE respectively). As another example, for cellular UEs equipped with multiple Transmission antennas (e.g., standardized in 3GPP Rel-9, 10), the power measurement could not distinguish the amplitude and phase information from different antennas, i.e., the interference could not be measured in an antenna-specific way.

Thus, the existing interference channel measurement schemes are desired to be improved to obtain the interference channel information required in a practical network, for example, LTE network, to address those problems.

SUMMARY

Accordingly, the invention seeks to preferably eliminate at least one of the above mentioned disadvantages singly or in any combination.

To solve at least one of the above problems, in a first aspect of the invention, there is provided a method in a base station for determining channel interference in a radio network comprising a device-to-device, D2D, capable UE and the base station serving at least one cellular UE, said method comprising: configuring the at least one cellular UE with a cellular uplink Reference Symbol, RS, related parameter; transmitting the cellular uplink RS related parameter associated with the at least one cellular UE to the D2D capable UE; and obtaining information of interference to the D2D capable UE measured by the D2D capable UE using the cellular uplink RS related parameter.

In a second aspect of the invention, there is provided a method in a device-to-device, D2D, capable UE for measuring channel interference in a radio network comprising the D2D capable UE and a base station serving at least one cellular UE, said method comprising: receiving a cellular uplink Reference Symbol, RS, related parameter from the base station, the parameter being used for configuring both the D2D capable UE and the at least one cellular UE; and measuring, by using the cellular uplink RS related parameter, interference to the D2D capable UE caused by the at least one cellular UE while cellular uplink RS is sent from the at least one cellular UE to the base station.

In a third aspect of the invention, there is provided a base station, comprising: a configuring module, adapted to configure at least one cellular UE with cellular uplink Reference Symbol, RS, related parameter; a transmitter, adapted to transmit the cellular uplink Reference Symbol, RS, related parameter associated with the at least one cellular UE to a D2D capable UE; and an obtaining module, adapted to obtain information of interference to the D2D capable UE measured by the D2D capable UE using the cellular uplink RS related parameter.

In a fourth aspect of the invention, there is provided a D2D capable terminal, comprising: a receiver, adapted to receive a cellular uplink Reference Symbol, RS, related parameter from a base station, the parameter being used for configuring both the D2D capable terminal and at least one cellular UE; and a measuring module, adapted to measure, by using the cellular uplink RS related parameter, interference caused by the at least one cellular UE while cellular uplink RS is sent from the at least one cellular UE to the base station.

According to the foregoing aspects of the invention, the regular cellular UL RS is employed for interference channel measurement. Furthermore, a more accurate interference channel measurement may be achieved to support interference avoidance in some specific scenario, such as, multi-cell and multi-antenna scenario.

BRIEF DESCRIPTION OF THE DRAWINGS

The features and advantages of the invention will be more apparent from the following exemplary embodiments of the invention with reference to the accompanied drawings, in which.

DETAILED DESCRIPTION

Embodiments of the invention will be described thoroughly hereinafter with reference to the accompanied drawings. It will be apparent to those skilled in the art that the invention may, however, be embodied in many different forms and should not be construed as limited to the embodiments and specific details set forth herein. Like numbers refer to like elements throughout the description.

Embodiments of the invention may be applied in various wireless networks, such as WCDMA, GSM, 3GPP LTE etc. Given the rapid development in communications, there will of course also be future type wireless communications technologies and systems with which the present invention may be embodied. It should not be seen as limiting the scope of the invention to only the aforementioned system.

In the context of the disclosure, for example, the term "base station" is exemplified with an eNB, it is not intended to limit the scope of the base station only to the eNB, but includes the systems capable of implementing the similar function as employed according to the embodiments of the invention.

Figure 1:
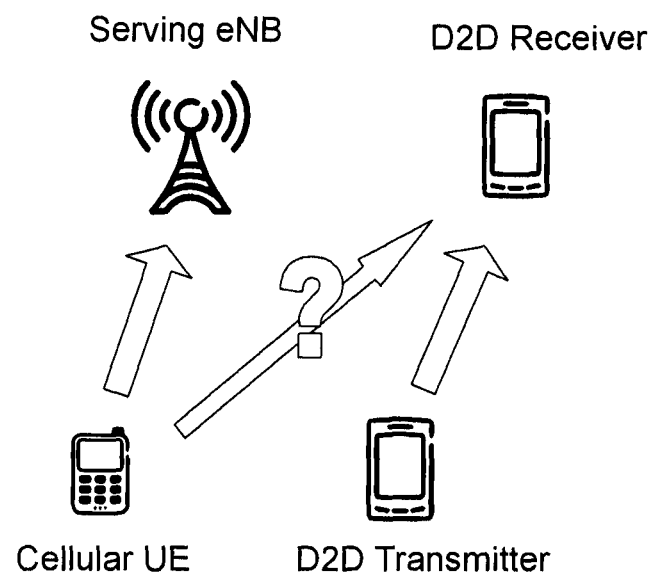
FIG. 1 illustrates a schematic diagram of a radio network environment comprising a device-to-device, D2D, capable UE and the base station serving at least one cellular UE.

FIG. 1 illustrates a schematic diagram of a radio network environment comprising a device-to-device, D2D, capable UE and the base station serving at least one cellular UE.

In the general context of the invention, the term "D2D" generally may refer to a direct device-to-device communication which allows direct communication between closely located user devices instead of conveying data from one device to the other via the radio and core network (e.g., base station).

This direct communication or device-to-device (i.e. D2D) enables a number of potential gains over the traditional cellular technique, because devices in D2D mode (also referred to as D2D devices) are much closer to one another than cellular devices which have to communicate via a cellular access point (e.g., eNB). Specifically, the gains involve, for example, the following aspects:

Capacity gain: first, radio resources (e.g. OFDM resource blocks) between the D2D and cellular layers may be reused (i.e., resources reuse gain). Second, a D2D link uses a single hop between the transmitter and receiver as opposed to the 2-hop link via a Cellular Access Point (i.e., hop gain);

Peak rate gain: due to the proximity and potentially favorable propagation conditions, high peak rates could be achieved (i.e., proximity gain); and Latency gain: When the UEs communicate over a direct link, eNB forwarding is not necessary and the end-to-end latency can decrease.

To sufficiently utilize the network resources and communicate with each other efficiently, FIG. 1 shows a radio network environment where a typical cellular communication and a direct device-to-device communication are available. In particular, in a typical multi-cell cellular system, cellular UEs typically communicate with a serving base station (e.g., eNB) while, within the cellular network environment, two terminals (e.g., represented as a D2D transmitter and a D2D receiver in the FIG. 1) in the proximity may communicate with each other directly (i.e., in D2D communication) by reusing specific cellular uplink resources of the cellular system.

In the context of the disclosure, the term "D2D capable UE", or "D2D UE" in a simplified form, may refer to a UE which is operable at least in D2D communication and cellular communication.

The term "D2D Transmission (Tx) UE", or its equivalent form "D2D UE transmitter", "D2D transmitter" may refer to a D2D capable UE which is transmitting data in D2D communication. The term "D2D Receiving (Rx) UE", or its equivalent form "D2D UE receiver", "D2D receiver" may refer to a D2D capable UE which is receiving data in D2D communication.

To implement this direct D2D communication in a traditional cellular network, it is important to obtain the particular interference information of the channel between the cellular UE transmitter and D2D UE receiver for mode selection, scheduling and power control mechanism design, so as to avoid interference to the D2D communication link caused by cellular UL transmission.

It is to be noted that, the embodiments of the invention mainly consider the interference channel from the cellular UE to the D2D capable UE, as shown in FIG. 1.

Figure 2:
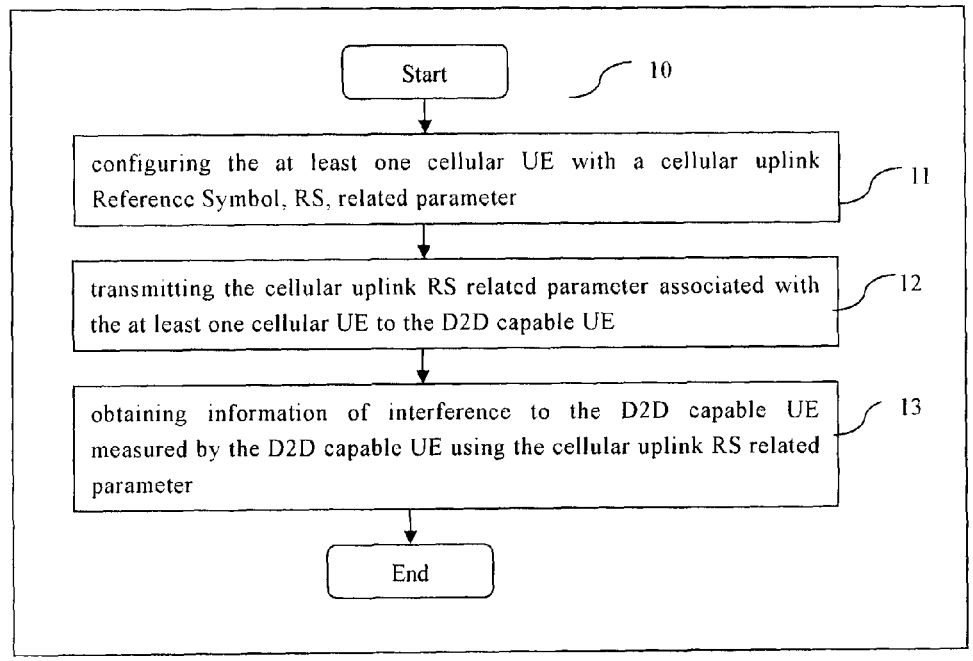
FIG. 2 illustrates a flowchart of a method in a base station for determining channel interference in the radio network environment as illustrated in FIG. 1 according to an embodiment of the invention.

FIG. 2 illustrates a flowchart of a method 10 in a base station for determining channel interference according to an embodiment of the invention.

In the method, the base station (e.g., eNB) may be enabled to send cellular UL reference signal (RS) configuration related information to a D2D capable UE to obtain more accurate interference measurement at the D2D capable UE. In particular, the method may include the following steps.

In step 11, a base station (e.g., eNB) may configure at least a cellular UE with cellular uplink Reference Symbol, RS, related parameter. In step 12, the base station (e.g., eNB) may transmit the cellular uplink RS related parameter associated with the at least a cellular UE to the D2D capable UE. In step 13, the base station may obtain information of interference to the D2D capable UE caused by the at least a cellular UE.

Specifically, with the cellular uplink RS related parameter, the interference caused by the at least a cellular UE may be measured at the D2D capable UE while cellular uplink RS is being sent from the at least a cellular UE to the base station, and then the measured interference caused by the at least a cellular UE may be reported from the D2D capable UE to the base station (e.g., eNB).

Herein, as an example but without limitation, the cellular UL RS configuration related information may refer to configuration information for Demodulation RS (DMRS) and/or Sounding RS (SRS) standardized in 3GPP LTE.

In an embodiment, SRS related configuration parameter transmitted from the base station to the D2D UE may include a SRS periodicity, a Cyclic Shift (CS), and a Comb Index (CI). The parameter Cyclic Shift may take the value from a group of integral values including, for example, 0, 1, 2, 3, 4, 5, 6 and 7. The Comb Index may take the value from a group of integral values including, for example, 0, 1. The at least a cellular UE mentioned above may include a plurality of cellular UEs. Each of the cellular UEs may be uniquely identified with the parameters, their values and the combination of values of various parameters, with reference to FIG. 4. As a result, information of interference caused by each cellular UE may be obtained by means of any of a set of CSs, any of a set of CIs, or any of a set of time offsets within the SRS periodicity.

In another embodiment, the DMRS related configuration parameter transmitted from the based station to the D2D UE may include Cyclic Shift (CS). As such, the Cyclic Shift may take the value from a group of integral values including, for example, 0, 1, 2, 3, 4, 5, 6 and 7. For example, each antenna of a cellular UE may be uniquely identified with the different values of the parameter CS. As a result, information of interference caused by each antenna of the cellular UE may be obtained by means of different CSs of DMRS to monitor interference change.

Figure 3:
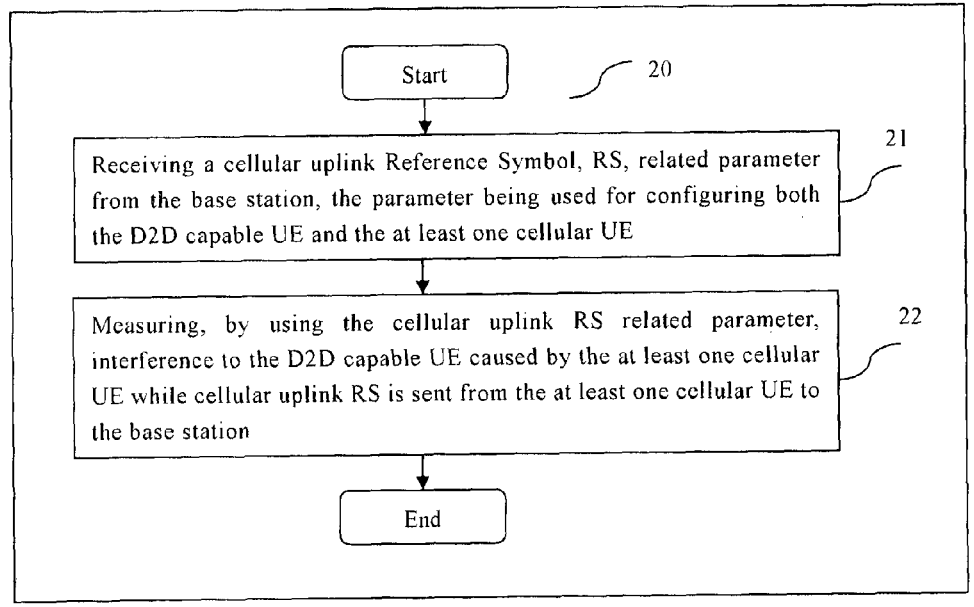
FIG. 3 illustrates a flowchart of a method in a D2D capable UE for interference channel measurement in the radio network environment as illustrated in FIG. 1 according to an embodiment of the invention.

FIG. 3 illustrates a flowchart of a method for interference channel measurement by a D2D UE according to an embodiment of the invention.

In the method, the D2D UE may be enabled to receive cellular UL reference signal (RS) configuration related information from a base station (e.g., eNB) to perform more accurate interference measurement at the D2D UE. The method may include the following steps.

In step 21, the D2D UE may receive cellular uplink Reference Symbol, RS, related parameter from the base station. The parameter may be used for configuring both the D2D UE and at least an cellular UE. In step 22, the D2D UE may measure interference caused by the cellular UE using the cellular uplink RS related parameter, while cellular uplink RS is being sent from the cellular UE to the base station.

In an embodiment, the SRS related configuration parameters received by the D2D UE from the base station may include a SRS periodicity, a Cyclic Shift (CS) and a Comb Index (CI). The parameter Cyclic Shift may take the value from a group of integral values including, for example, 0, 1, 2, 3, 4, 5, 6 and 7. The parameter Comb Index may take the value from a group of integral values including, for example, 0, 1. In the similar way as mentioned above, the interference may be measured at the D2D UE in a UE-specific way based on different CSs, different CIs, and/or different time offsets within the SRS periodicity.

In another embodiment, the DMRS related configuration parameter received by the D2D UE from the base station may include a Cyclic Shift (CS). The Cyclic Shift may take the value from a group of integral values including, for example, 0, 1, 2, 3, 4, 5, 6 and 7. In the similar way as mentioned above, the interference may be measured in UE antenna-specific way based on different CSs of DMRS to monitor interference change.

In still another embodiment, upon the interference channel measurement, D2D UE may further perform some post-processing operations. Herein, the term "post-processing" refers to a general concept of processing after the D2D UE measures the interference channel related information but before reporting the interference channel related information to the base station. By way of example but without limitation, the post-processing may include, (a) filtering interference to reduce fast fading effect, e.g., combating with the time-varying effect of the channel, an averaging operation may be done based on multiple samples, so as to reduce fast fading effect; (b) quantifying interference to trade off between performance and overhead, e.g., reducing the signaling overhead, different quantification methods may be used to indicate the interference, as a tradeoff between performance and overhead; or (c) reporting to the base station only channel information of the cellular UE which causes least interference, etc.

Figure 5:
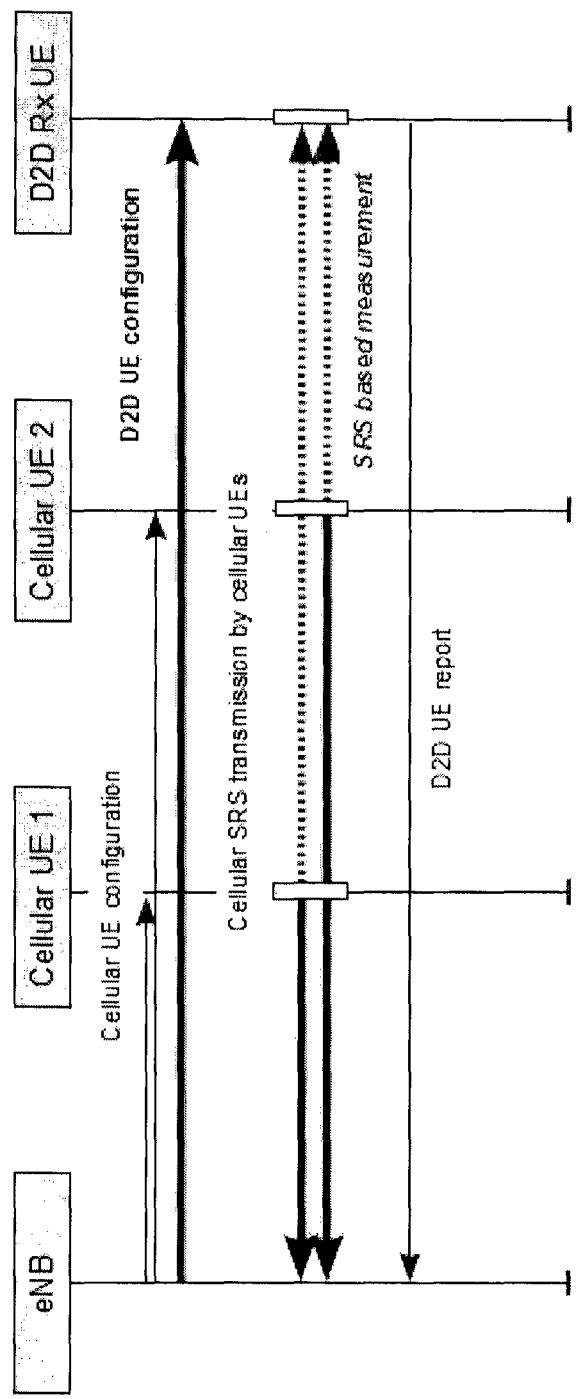
FIG. 5 illustrates an exemplary interactive workflow of interference channel measurement based on SRS according to one embodiment of the invention.
Figure 7:
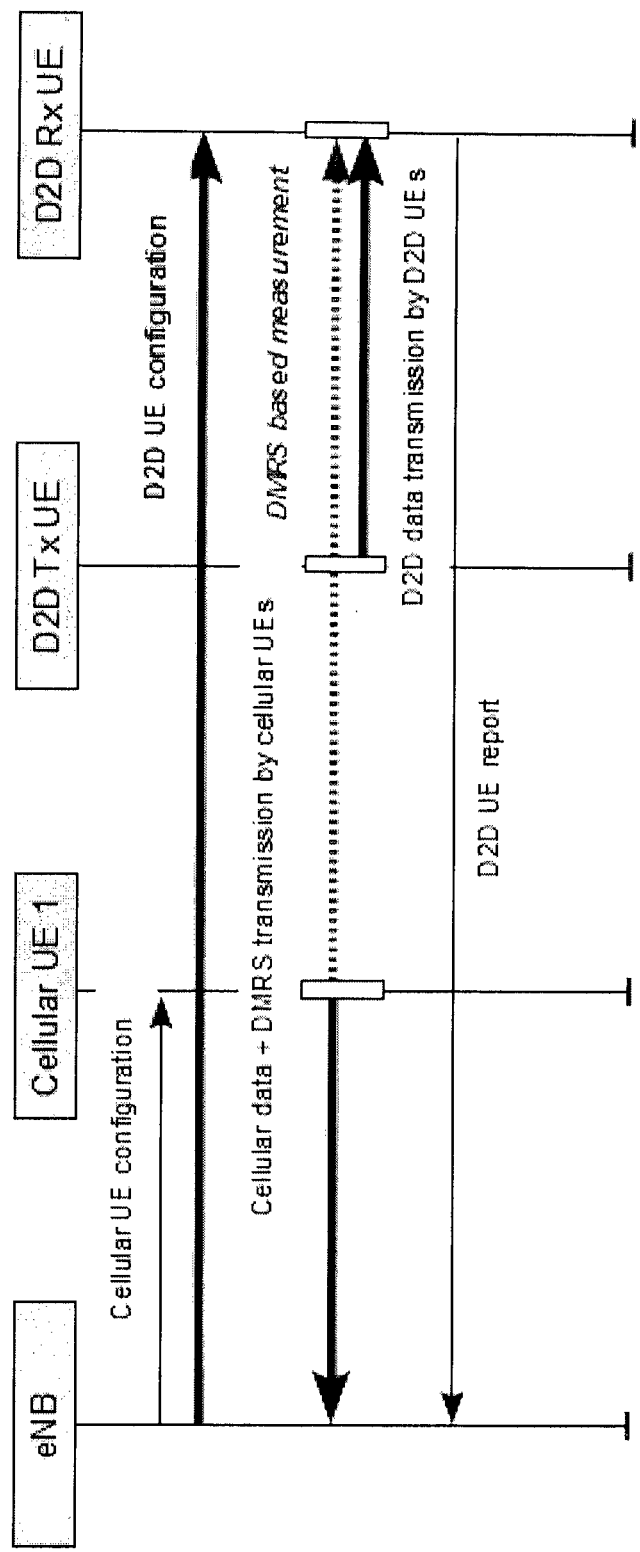
FIG. 7 illustrates an exemplary interactive workflow of interference channel measurement based on DMRS according to another embodiment of the invention.

Hereinafter, implementation of two interactive workflows of interference channel measurement, based on SRS and DMRS respectively, in the radio network system environment as shown in FIG. 1 is provided, as shown in FIG. 5 and FIG. 7.

FIG. 5 illustrates an exemplary interactive workflow of interference channel measurement based on SRS according to one embodiment of the invention.

In this embodiment, a pro-active interference measurement based on SRS is implemented. Here, the term "pro-active" generally means the interference measurement is performed before D2D transmission starts, so as to select actively a cellular UE which causes a minimum interference to the D2D UE for efficient resource reuse.

Figure 4:
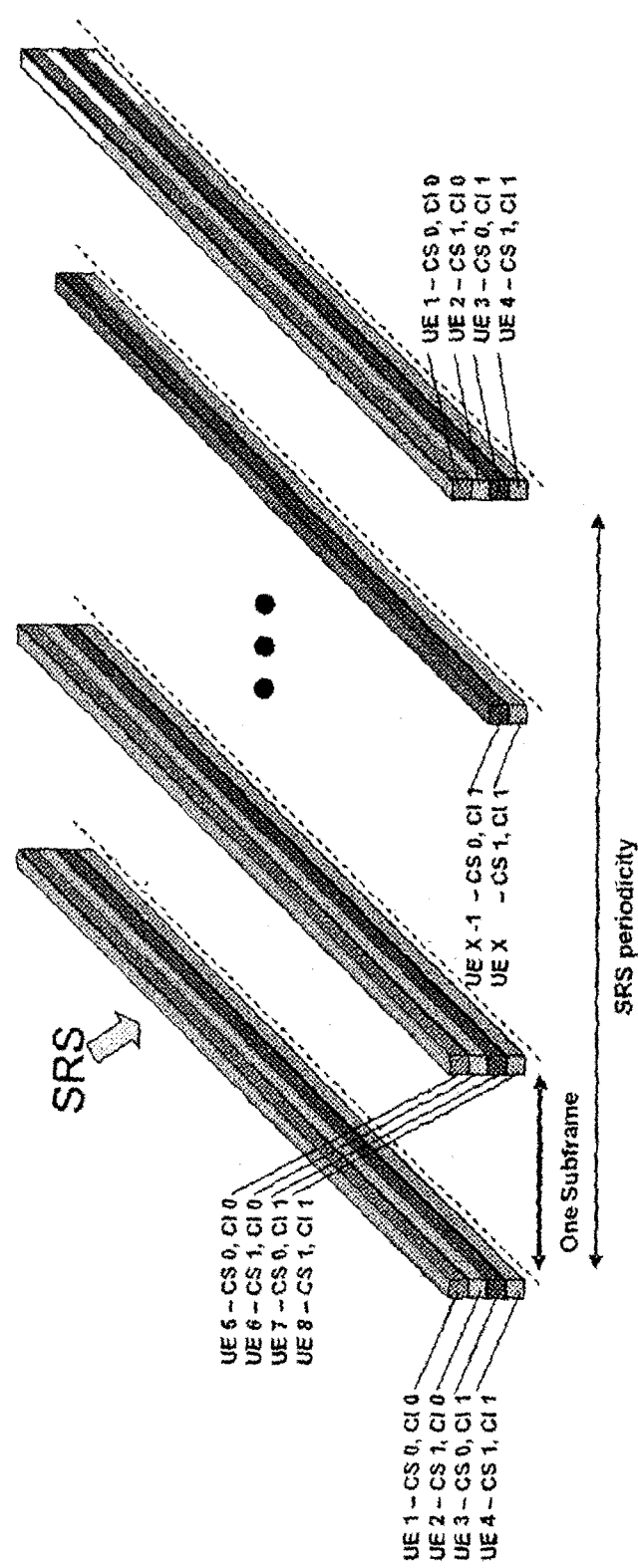
FIG. 4 illustrates a schematic diagram of an exemplary SRS configuration with X cellular UEs according to one embodiment of the invention.

In this embodiment, the cellular UEs would be configured to send SRS for interference measurement at D2D receivers before D2D transmission starts. FIG. 4 illustrates a schematic diagram of an exemplary SRS configuration with a number of X cellular UEs according to one embodiment of the invention. The example configuration of the SRS transmission as shown in FIG. 4 is that, the measured cellular UEs send wideband periodic SRS with the same periodicity, but each with a different Cyclic Shift (CS) or Comb Index (CI). Hence, the D2D UE would monitor all the occupied CS, CI, and measure the corresponding interference. The detailed signaling steps are shown in FIG. 5. In particular, in Step 1.1, at least one cellular UE may be configured to send SRS. In particular, the base station (e.g., eNB) may configure a set of at least one cellular UE to send SRS. The detailed parameters of SRS may be sent to each cellular UE using, e.g., dedicated RRC signaling.

In Step 1.2, the D2D UE may be configured to receive the configuration parameters of SRS from the base station. As an example shown in FIG. 4, the configured parameters include a SRS periodicity (e.g., 5 ms), an occupied CS set (e.g., 0 and 1), an occupied CI set (e.g., 0 and 1) and/or the cellular UE number (e.g., x=18). It is to be noted that this information is common for different D2D UE receivers doing measurement operation, thus can be sent to all those D2D UEs in a broadcasting way, i.e., using a common signaling.

In Step 2, the D2D UE may measure the interference based on the configured SRS parameters while the cellular UEs transmit SRS as configured. Additionally, it shall be understood that these SRS may also be used by the base station for cellular UL sounding.

In Step 3, based on the SRS related parameters, the D2D UE receivers may obtain the interference information. Specifically, interference information for different CSs, different CIs, and/or different time offsets within the SRS periodicity may be obtained. An interference level list may be created, which may be indexed by CS, CI and/or time offset. This information may also be post-processed as described above at D2D UEs. Then, the resultant interference measurement may be reported to the base station for further decision, e.g., in order to select a cellular UE which causes least inter-system interference (e.g., to the D2D UE) to pair with the D2D UE for efficient resource reuse.

In the embodiment, the SRS related parameters are used for interference measurement, in order to select optimal resources for D2D transmission before the D2D transmission starts. However, it is to be noted that it is not limited to SRS. Alternatively, DMRS may also be applied in a suitable way in the embodiment for interference measurement.

Specifically, since DMRS is coupled with UL data, and the traffic of different UEs could be various, it is hard to arrange the cellular UE candidates to transmit in a unified way, i.e., their allocated resource size/location could be very different. Thus, if the DMRS related parameter is used here, besides the necessary CS information of DMRS, the base station has to notify the UE-specific scheduling information to D2D UE receivers for proper interference measurement on UE-specific resource location.

Furthermore, as shown in FIG. 4, cellular SRS is configured in a predefined manner, e.g., occupying the same set of CS and CI in all subframes (e.g., always allocate 2 CS indexes*2 CI indexes=4 SRS for 4 UEs in each subframe) except the final subframe (since x=18 which can not be divided by 4 exactly), the signaling overhead it causes may be largely reduced, considering it is a common signaling for all D2D receivers.

FIG. 7 illustrates an exemplary interactive workflow of interference channel measurement based on DMRS according to another embodiment of the invention.

In the embodiment, a re-active interference measurement based on DMRS is implemented. Here, the term "re-active" generally means the interference measurement is performed during D2D transmission, so as to monitor the interference channel change during D2D transmission, thus, the resource sharing may be disabled as soon as the interference becomes too large.

Figure 6:
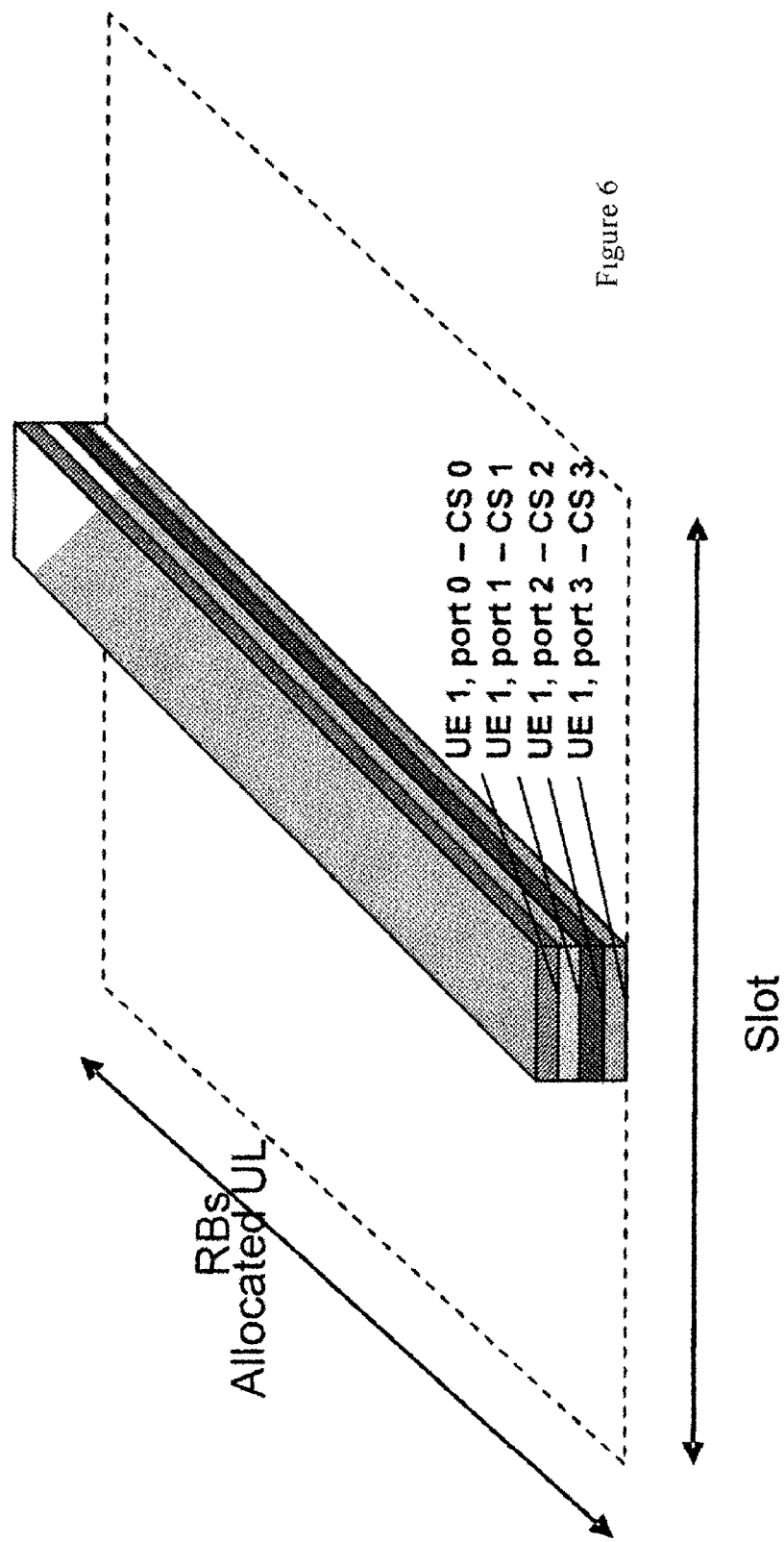
FIG. 6 illustrates a schematic diagram of an exemplary DMRS configuration with 4 antenna ports at a cellular UE according to another embodiment of the invention.

In the embodiment, a schematic diagram of an exemplary DMRS configuration with four antenna ports at a cellular UE is shown in FIG. 6. As an example, in FIG. 6, each of the four antenna ports at the cellular UE is assigned with a different Cyclic Shift.

In this embodiment, after one cellular UE is selected by the base station (e.g., eNB) to pair with the D2D link for resource reuse, this cellular UE's UL DMRS information would be sent to D2D receiver for monitoring the interference channel change during D2D transmission, so that the resource sharing may be disabled as soon as the interference becomes too large. Furthermore, considering the cellular UE may employ multi-antenna transmission scheme (as defined in 3GPP Rel-10), the cellular UE may occupy multiple CSs of DMRS on different antenna ports. Hence, the D2D UE may monitor the interference channel in an antenna-specific manner, so that the interference avoidance may be improved by applying the method of the embodiment for multi-antenna technology. The exemplary signaling steps are shown in FIG. 7.

In Step 1.1, the cellular UE may be configured by the base station (e.g., eNB) with DMRS. Specifically, the detailed DMRS related parameter is sent to the cellular UE using regular UL grant contained in PDCCH, along with the cellular UL resource allocation information.

In Step 1.2, the base station sends the configuration parameter of DMRS of the cellular UE to the paired D2D receiver. The paired D2D receiver may be determined, for example, based on the previous SRS-based approach. As shown in FIG. 6, the information needed by the D2D receiver may only include the DMRS occupied CS set (e.g., 0, 1, 2, and 3). Please note that this information is dedicated for the paired D2D link, thus can be sent to D2D UEs along with the D2D resource allocation information, which is sent by eNB to the D2D link.

In Step 2, D2D UE measures the interference using the configuration information sent by eNB while the cellular UE transmit DMRS with UL data. It shall also be understood that these DMRS may also be used by the base station for cellular UL coherent demodulation.

In Step 3, based on the measurement of DMRS sent by cellular UE transmitter, the D2D receivers may obtain the interference information for different CSs. The information may be utilized in different manners. For example, 1) the "recommended cellular PMI" may be selected accordingly to avoid severe interference, and is thus sent to eNB by D2D UE, or 2) if it is found that the interference from the paired cellular UE is too severe to reuse resource, a "harmful interference detected" indication would be sent to eNB by D2D UE.

In this embodiment, the DMRS related parameter may be used for interference measurement, in order to monitor the interference change during D2D data transmission after the transmission starts. It may be combined with cellular UL multi-antenna to further avoid interference. Although DMRS is used to measure interference as an example in the embodiment, it is to be understood that SRS may also be applied herein. Specifically, if SRS is used in the scenario as in this embodiment, the base station needs to establish a mapping between interfering cellular UE UL transmission and SRS transmission, in order for the D2D UE receiver to monitor the activity of cellular UEs. Different from the case where SRS is used to measure interference before D2D transmission starts, only the co-scheduled cellular UE which is causing interference may be measured/monitored in this embodiment.

It is to be noted that, configuring cellular DMRS in a regular manner, e.g., occupying the same set of CS in all scheduled subframes (e.g., always allocate CS 0 to 3 to the paired cellular UE in all subframes), the configuration information only needs to be sent to D2D link at the first time it is co-scheduled with the cellular UE, in this way, the extra overhead may be largely reduced.

Further, different from the SRS-based interference measurement before D2D transmission starts, the cellular RS may be interfered by D2D transmission since the measurement is done with D2D data transmission. One solution to this is to located D2D reference signal at exactly the same frequency-time location as cellular DMRS, but occupying different CS set for orthogonality, or it may use different RS sequence group directly.

Figure 8:
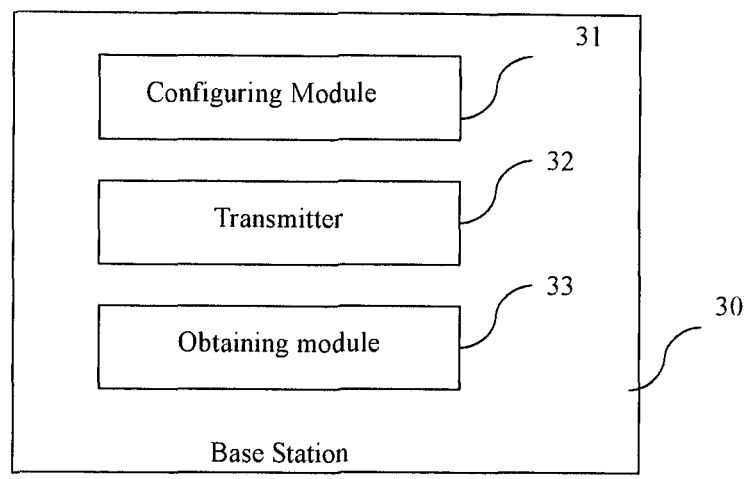
FIG. 8 illustrates a schematic structural diagram of a base station for determining channel interference according to an embodiment of the invention.

FIG. 8 illustrates a schematic structural diagram of a base station 30 for interference channel determination in a radio network environment as shown in FIG. 1 including according to an embodiment of the invention.

In the embodiment, the base station 30 may at least include a configuring module 31 which may configure at least one cellular UE with cellular uplink Reference Symbol, RS, related parameter. The base station 30 may further include a transmitter 32 which may transmit to a D2D capable UE the cellular uplink Reference Symbol, RS, related parameter associated with the at least one cellular UE. The base station 30 may further include an obtaining module 33 which may obtain information of interference to the D2D capable UE caused by the at least one cellular UE. The interference may be measured by using the cellular uplink RS related parameter while cellular uplink RS is being sent from the at least one cellular UE to the base station, and then may be reported to the base station from the D2D capable UE.

In an embodiment, the configuring module 31 may transmit SRS related configuration parameters, including a SRS periodicity, and a Cyclic Shift, CS, and a Comb Index, CI, to both the D2D capable UE and the at least one cellular UE before D2D transmission occurs, in order to select optimal resources for reuse by the D2D capable UE.

Alternatively, the configuring module 31 may transmit the DMRS related configuration parameter, including a Cyclic Shift, CS, to both the D2D capable UE and the at least one cellular UE, during D2D communication, in order to monitor interference change.

In an embodiment, the obtaining module 33 may obtain the interference information in a UE-specific way based on different values of parameter CS, CI, and time offset within the SRS periodicity. Alternatively, the obtaining module 33 may obtain the interference information in an antenna port specific way based on different values of parameter CS of DMRS.

Figure 9:
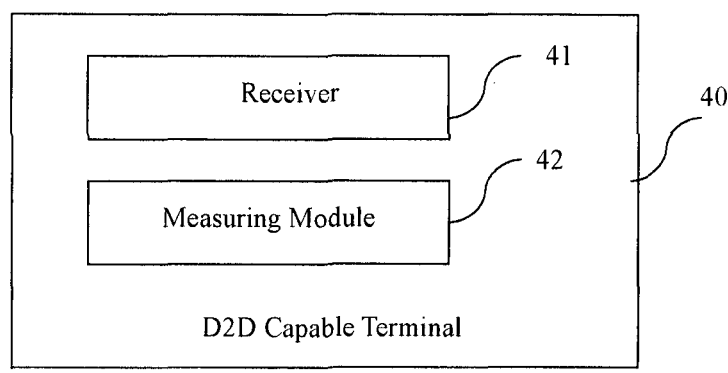
FIG. 9 illustrates a schematic structural diagram of a D2D capable UE for interference channel measurement according to an embodiment of the invention.

FIG. 9 illustrates a schematic structural diagram of a D2D capable UE 40 for interference channel measurement in a radio network environment as shown in FIG. 1 according to an embodiment of the invention.

In the embodiment, the D2D capable UE 40 may at least include a receiver 41 which may receive cellular uplink Reference Symbol, RS, related parameter from a base station. The parameter may be used for configuring the D2D capable UE 40 and at least a cellular UE. The D2D capable UE 40 may further include a measuring module 42 which may measure, by using the cellular uplink RS related parameter, interference caused by the at least one cellular UE, while cellular uplink RS is being sent from the at least one cellular UE to the base station.

In an embodiment, the receiver 41 may receive SRS related configuration parameters, including a SRS periodicity, a Cyclic Shift, CS, and a Comb Index, CI, sent from the base station. Alternatively, the receiver 41 may receive a DMRS related configuration parameter, including a Cyclic Shift, CS, sent from the base station.

The measuring module 42 may measure the interference in a UE-specific way based on different values of parameter CS, CI, and time offset within the SRS periodicity. Alternatively, the measuring module 42 may measure the interference in an antenna port specific way based on different values of parameter CS of DMRS.

This disclosure generally enables a base station (e.g., eNB) to send cellular UL reference signal (RS) configuration related information to a D2D capable UE, e.g., configuration information for Demodulation RS (DMRS) and/or Sounding RS (SRS) standardized in 3GPP LTE, thus the D2D capable UE may use those parameters information to measure the interference caused by individual cellular UEs and/or individual antenna ports thereof to obtain more accurate interference information at the D2D capable UE.

In is to be noted that the features or functionality in one embodiment may be applied to another embodiment as appropriately.

It will be appreciated that the invention may be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

It is to be noted that, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Further, it is to be noted that, the order of features/steps in the claims or in the description do not imply any specific order in which the features/steps must be worked. Rather, the steps/features may be performed in any suitable order.

The terminology used herein is for the purpose of describing particular embodiments only and is not intended to limit to the invention. As used herein, the singular forms "a", "an" and "the" are intended to comprise the plural forms as well, unless otherwise stated. It will be further understood that the terms "including", "comprising" and conjugation thereof when used herein, specify the presence of stated features, integers, steps, operations, elements, and/or components, but do not preclude the presence or addition of one or more other features, integers, steps, operations, elements, components, and/or groups thereof.

Although the invention has been particularly shown and described with reference to exemplary embodiments thereof, it will be understood by those skilled in the art that various changes in form and details may be made without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims.

The invention claimed is:

1. A method in a base station for determining channel interference in a radio network comprising a device-to-device (D2D) capable user equipment (UE) and the base station serving at least one cellular UE, said method comprising:
configuring the at least one cellular UE with a Demodulation RS (DMRS) related parameter;
transmitting the DMRS related parameter associated with the at least one cellular UE to the D2D capable UE;
transmitting a DMRS related configuration parameter, including a Cyclic Shift (CS) to both the D2D capable UE and the at least one cellular UE; and
obtaining information of interference to the D2D capable UE measured by the D2D capable UE using the DMRS related parameter.

2. The method of claim 1, wherein the obtaining information of interference to the D2D capable UE comprises receiving the interference information in a report transmitted from the D2D capable UE.

3. The method of claim 1, comprising:
obtaining the interference information for any of a set of CSs of DMRS to monitor interference change.

4. A method in a device-to-device (D2D) capable UE for measuring channel interference in a radio network comprising the D2D capable UE and a base station serving at least one cellular UE, said method comprising:
receiving a Demodulation RS (DMRS) related parameter from the base station, the parameter being used for configuring both the D2D capable UE and the at least one cellular UE;
receiving a DMRS related configuration parameter, including a Cyclic Shift (CS) sent from the base station; and
measuring, by using the DMRS related parameter, interference to the D2D capable UE caused by the at least one cellular UE while the DMRS related parameter is sent from the at least one cellular UE to the base station.

5. The method of claim 4, comprising: measuring the interference for any of a set of CSs of DMRS to monitor interference change.

6. The method of claim 4, further comprising one of following post-processing operations:

filtering the interference to reduce fast fading effect;
quantifying the interference to trade off between performance and overhead; or
reporting to the base station only channel information of the cellular UE which causes least interference.

7. A base station, comprising:
a configuring module, adapted to configure at least one cellular UE with a Demodulation RS (DMRS) related parameter;
a transmitter, adapted to transmit the DMRS related parameter associated with the at least one cellular UE to a device-to-device (D2D) capable UE and transmit a DMRS related configuration parameter, including a Cyclic Shift (CS) to both the D2D capable UE and the at least one cellular UE; and
an obtaining module, adapted to obtain information of interference to the D2D capable UE measured by the D2D capable UE using the DMRS related parameter.

8. The base station of claim 7, wherein the obtaining module is adapted to receive the interference information in a report transmitted from the D2D capable UE.

9. The base station of claim 7, wherein the obtaining module is adapted to obtain the interference information for any of a set of CSs of DMRS to monitor interference change.

10. A D2D capable terminal, comprising:
a receiver, adapted to receive a Demodulation RS (DMRS) related parameter from a base station, the parameter being used for configuring both the device-to-device (D2D) capable terminal and at least one cellular UE and receive the DMRS related configuration parameter, including a Cyclic Shift (CS) sent from the base station; and
a measuring module, adapted to measure, by using the DMRS related parameter, interference caused by the at least one cellular UE while the DMRS related parameter is sent from the at least one cellular UE to the base station.

11. The D2D capable terminal of claim 10, wherein the measuring module is adapted to measure the interference for any of a set of CSs of DMRS to monitor interference change.

* * * * *